United States Patent [19]

Krakkay et al.

[11] Patent Number: 4,673,721
[45] Date of Patent: Jun. 16, 1987

[54] POLYACRYLONITRILES WITH A LOW K VALUE

[75] Inventors: Tibor Krakkay, Munich; Tatjana Poggi, Saal; Ernst Schubert, Kelkheim, all of Fed. Rep. of Germany

[73] Assignee: Hoechst Aktiengesellschaft, Frankfurt am Main, Fed. Rep. of Germany

[21] Appl. No.: 839,288

[22] Filed: Mar. 13, 1986

Related U.S. Application Data

[63] Continuation of Ser. No. 636,965, Aug. 2, 1984, abandoned.

[30] Foreign Application Priority Data

Aug. 5, 1983 [DE] Fed. Rep. of Germany ....... 3328276

[51] Int. Cl.$^4$ .................... C08F 20/44; C08F 20/42
[52] U.S. Cl. ................. 526/329.3; 526/328.5; 526/341
[58] Field of Search .............. 528/386; 526/329.3, 526/341, 342, 328.5

[56] References Cited

U.S. PATENT DOCUMENTS

| | | | |
|---|---|---|---|
| 2,934,524 | 4/1960 | Phelps | 526/329.3 |
| 3,025,278 | 3/1962 | Pitts | 526/329.3 |
| 3,200,100 | 8/1965 | Dennstedt | 526/329.3 |
| 3,255,158 | 6/1966 | Anthes | 526/329.3 |
| 4,326,051 | 4/1982 | Süling | 526/329.3 |
| 4,446,291 | 5/1984 | König | 526/209 |

*Primary Examiner*—Christopher Henderson
*Attorney, Agent, or Firm*—Connolly and Hutz

[57] ABSTRACT

The invention relates to homopolymers and copolymers of acrylonitrile with very low Fikentscher K values of 34–15 and a total content of sulfonate and sulfate end groups, which do not originate from correspondingly substituted comonomers, of 250 to 1,000 milliequivalents per kilogram of polymer, 180 to 900 milliequivalents per kilogram being in the form of sulfonate end groups, and to suitable semi-continuous or continuous precipitation polymerization processes for their preparation by means of a redox system in an aqueous medium.

The resulting polymers can be extruded to shaped articles. In particular, after hydrolysis, they can be used as emulsifiers and deep bore auxiliaries.

1 Claim, No Drawings

POLYACRYLONITRILES WITH A LOW K VALUE

CROSS REFERENCE

This application is a continuation of application Ser. No. 636,965 filed Aug. 2, 1984 by Tibor Krakkay, Tatjana Poggi, Ernst Schubert for "Polyacrylonitriles with a Low K Value, a Process for thier preparation and thier Suitable Use" now abandoned.

The invention relates to a process for the preparation of homopolymers and copolymers of acrylonitrile with extremely low K values of 34 to 15, and to the products thereby obtained and their use.

BACKGROUND OF THE INVENTION

High molecular weight homopolymers and copolymers of acrylonitrile are produced on a large scale in industry. They are used, in particular, as a raw material for the production of fibers and threads. The K value of these high molecular weight polymers is as a rule 80 to 90. The polymers are predominantly preared by the process of precipitation polymerization in an aqueous medium. The redox polymerization process, in which a free radical donor—an inorganic pre-compound—is used together with a reducing agent, is usually preferred. For the concept and the determination of the K value, c.f. Fikentscher, Cellulosechemie 13 (1932), 58.

Low molecular weight homopolymers and copolymers of acrylonitrile have already frequently been described. However, it is difficult to compare the results thereby obtained, since the molecular weights $M_v$ determined by viscometry are calculated from the intrinsic viscosity $[\eta]$ determined by viscometry using the most diverse equations. Some authors have resorted to osmometric determinations instead of the values determined by viscometry, and give molecular weights $M_n$ as the number-overoge. As is known, the values for the molecular weights $M_v$ and $M_n$ agree only in the rarest of cases, it being possible, for example, for the value of $M_n$ to be only half the value of $M_v$. The Fikentscher "K value" is used in the present text as the parameter for characterizing the average size of the molecule. It is an acrylonitrile polymer parameter which is generally customary in the art.

The preparation of acrylonitrile homopolymers with low molecular weights $M_v$ of 21,690 to 8,650 has already been described in Colloid and Polymer Science 256, 1027 (1978). The polymerization is carried out by the solution polymerization process in dimethylformamide, using an organic azo compound as a free radical donor. In this process, the end product is obtained in solution and must still be isolated in an expensive manner. Such polymers contain no sulfonate and/or sulfate end groups.

Another solution polymerization process for the preparation of low molecular weight polyacrylonitriles, with molecular weights $M_v$ of about 30,000 to 2,000, is also described, in U.S. Pat. No. 2,763,636. The polymerization is carried out in concentrated salt solutions, for example zinc chloride solutions, with $H_2O_2$ or $K_2S_2O_8$ as a catalyst. However, it is carried out without a reducing agent in the presence of $Cu^{2+}$ ions.

The homopolymers and copolymers of acrylonitrile described in U.S. Pat. No. 3,208,962 are also prepared by solution polymerization processes in concentrated zinc chloride solutions by means of $H_2O_2$ and oxyacids of chlorine. As in the processes described above, the end product can be isolated only in an expensive manner, and the recovery of the salt solutions used is associated with considerable diificulties.

German Auslegeschrift No. 2,655,714 describes processes for the preparation of homopolymers of acrylonitrile which have very low K values and are also prepared by a precipitation polymerization process. However, a mixture of isopropanol and water is used as the reaction medium and the polymerization is carried out batchwise. The presence of isopropanol in the reaction mixture makes it difficult to recover the unreacted monomeric acrylonitrile, since a three-component system must now be separated by distillation, instead of acrylonitrile and water. In this previous literature, $H_2O_2$ is described as the catalyst and hydroxylamine salts or hydrazine salts are described as the activator. Because of their toxicity, these reducing agents lead to environmental problems in the effluents. In addition, the above polymers contain no sulfonate and/or sulfate end groups in the chain molecule.

German Pat. No. 2,318,609 describes the preparation of homopolymers and copolymers of acrylonitrile by the precipitation polymerization process. Water is used as the reaction medium and the reaction is carried out with a persulfate catalyst and a pyrosulfite activator. However, the process leads only to polymers down to a K value of 35. It is also a disadvantage that the reaction is carried out only in dilute aqueous solutions at low acrylonitrile concentrations of 0.1 to 1.5% by weight, based on the reaction mixture, which unavoidably leads to low space/time yields. The polymerization is carried out in the absence of iron ions, and polyphosphates, which serve as complexing agents for iron and traces of heavy metal, are added to the reaction mixture. Low molecular weight acrylonitrile homopolymers which have been prepared by batchwise precipitation polymerization in an aqueous medium at pH values >4 by means of persulfate catalysts without using activators or accelerators are also described in U.S. Pat. No. 3,488,336. The very low molecular weights are only achieved by carrying out the polymerization of the acrylonitrile in very high dilution at monomer concentrations of 0.05 to 0.5% by weight over very long reaction times. The yields are at most 23%, from which a space/time yield of only 0.01 to 0.2 g of polymer per liter of reaction solution and hour is calculated. The method described is thus unsuitable for an industrial process. Moreover, the resulting polymers containing virtually no sulfonate end groups.

It is emphasized both in German Patent No. 2,318,609 and in U.S. Pat. No. 3,488,336 that low molecular weight polyacrylonitriles can only be obtained if the polymerization of acrylonitrile is carried out in very dilute aqueous solution.

OBJECT OF THE INVENTION

There was therefore still the object of preparing acrylonitrile homopolymers and copolymers which have very low K values and a high content of strongly acid end groups, and to develop a process for this which can be carried out on a large industrial scale, as far as possible utilizes the precipitation polymerization process carried out on a wide scale in industry for the preparation of polyacrylonitriles as a raw material for fibers, does not require new chemicals or chemicals other than those necessary for the preparation of the known polyacrylonitrile raw materials, avoids the necessity of separation of three-component mixtures during working up of the reaction solutions and allows acrylonitrile polymers with a very high content of sulfonate and sulfate end groups already to be prepared without any addition of correspondingly substituted comonomers.

SUMMARY OF THE INVENTION

Surprisingly, it has now been found that, in contrast to the teachings of the prior art, it is after all possible to prepare acrylonitrile homopolymers and copolymers with the desired very low K value of 34 to 15 and a very high content of sulfonate and sulfate end groups, and in particular using a very high monomer concentration, by the process of precipitation polymerization in aqueous solution by means of a redox system. The process found can be operated with high space/time yields.

DETAILED DESCRIPTION OF THE INVENTION

The invention thus relates to, inter alia, a continuous or semi-continuous process for the preparation of acrylonitrile homopolymers or copolymeres which contain at least 60% by weight of acrylonitrile units and up to 40% by weight of units which can be copolymerized with acrylonitrile, and have Fikentscher K values of 34 to 15. These K values correspond to average molecular weights $M_v$ (on the basis of measurements by viscometry) of about 10,000 to 2,700. These values have been calculated in accordance with the method of Marzolph and Scholtan, Makromolekulare Chemie 57, 52 (1962). These polymers are obtained by continuous or semi-continuous polymerization by the process of precipitation polymerization using high monomer concentrations of 12 to 30% by weight, preferably 12 to 27%, based on the total amounts of water and monomers metered in during the same unit of time, in an aqueous medium by means of a redox system, the redox system consisting of a persulfate catalyst in concentrations of 0.5 to 2.5% by weight (calculated as $S_2O_8^{-2}$), a sulfite activator in concentrations of 5 to 25% by weight (calculated as $S_2O_5^{2-}$) and iron ions as an accelerator in concentrations of $6 \times 10^{-4}$ to $2 \times 10^{-2}\%$ by weight, in each case based on the amount of water metered in in the same unit of time, the weight ratio of persulfate to pyrosulfite varying from 1:2 to 1:30 and the average residence time of the monomers in the reaction mixture during the polymerization being 1 to 4 hours, preferably 1.5 to 2.5 hours. Preferably, potassium persulfate is used as the catalyst, sodium pyrosulfite is used as the activator and Mohr's salt is used as the source of iron ions. The polymerization temperature is usually 30° to 65° C., and is preferably between 45° and 60° C. Any compound which can be copolymerized with acrylonitrile can be used as the comonomer. Preferred comonomers are methyl acrylate and vinyl acetate. The space/time yield in the polymerization by the process according to the invention is 25 to 105, preferably 50 to 95, g/liter.-hour and is thus many times greater than the space/time yield of processes according to the prior art.

The acrylonitrile homopolymers and copolymers according to the invention with the desired low K values of 34 to 15 are only obtained if the following 5 parameters are kept within the required limits:
concentration of persulfate catalyst
concentration of sulfite activator
concentration of iron ions as the accelerator
ratio of persulfate to pyrosulfite and
residence time of the monomers in the reaction mixture.

If the values given for the ranges are exceeded, a greater expenditure achieves no further technical effect. If the values fall below the lower limits of the ranges of these 5 parameters, polymers with the desired K values of below 34 are no longer obtained.

It is evident that the parameters cannot be chosen arbitrarily within the abovementioned limits. They depend on one another and must therefore be matched to one another, in order to obtain the desired polymers with K values ≦34. The following guidelines are for this purpose, in addition to the statements in the examples.

If smaller amounts of catalyst are used, the concentration of accelerator should be increased and the polymerization should be carried out at a high activator concentration (increased catalyst/activator ratio).

If a low catalyst/activator ratio is used, high concentrations of catalyst and accelerator must be employed. A small amount of iron ions requires longer residence times and large amounts of catalyst and activator as well as a high catalyst/activator ratio.

For a shorter residence time, the polymerization must be carried out with large amounts of catalyst, activator and accelerator as well as a high catalyst/activator ratio.

A reduction in the monomer concentration in general leads to polymers with a lower K value. If pure acrylonitrile is used instead of a mixture of acrylonitrile and comonomer(s), the K value of the polymer prepared therefrom likewise decreases.

Keeping within the range of monomer concentration of 12 to 30% by weight, based on the total amount of water and monomers metered in during the same unit of time, ensures rational industrial production. If the limit is exceeded, reasonable handling of the reaction mixture, which becomes ever more viscous, can no longer be guaranteed with certainty, and if the value falls below the limit of 12%, the space/time yield is reduced to such an extent that it no longer makes sense to carry out the polymerization industrially.

The polyacrylonitriles prepared according to the invention with K values of 34 to 15 are distinguished by a very high total content of sulfonate and sulfate end groups of 250 to 1,000 milliequivalents/kg of polymer, with contents of sulfonate end groups of 180 to 900 milliequivalents/kg of polymer. This range corresponds to a total content of —SO$_3$Na and —OSO$_3$Na of about 2.5 to more than 10% by weight. It should be pointed out here that these data in each case relate to contents of end groups. These values are thus achieved without the addition of comonomers which already contain corresponding groups in the molecule.

The suspensions obtained in the polymerizations carried out according to the invention can be separated by filtration or centrifugation and are thus obtained as water-containing cakes. It has been found that the particle size of the polymer decreases greatly as the K value decreases. However, no separation or washing problems occur if centrifuges are used instead of filter apparatuses. In contrast to polyacrylonitrile with a high K value, the products according to the invention are soluble not only in aprotic solvents, such as, for example, dimethylformamide, but also in mixtures of, for example, acetonitrile and water. 10% strength polymer solutions in dimethylformamide gel only after addition of about 25% of water. This astonishing deviation from the known acrylonitrile polymers is caused by the high content of sulfonate and sulfate end groups.

On the basis of these properties, the products according to the invention are suitable as components of paint systems and coatings. The polymers are already easy to extrude to shaped articles when in the form of the water-containing filter cake.

If the polymers according to the invention are subjected, for example, to alkaline hydrolysis, polyacrylates, which, however, still contain residual nitrogen in the molecule in the form of heterocyclic structures which are difficult to hydrolyze, are obtained, depending on the alkali/polymer ratio and on the hydrolysis time.

These hydrolysis products are suitable as emulsifiers, dispersing agents and auxiliaries, in particular as scale inhibitors for deep bores and in crude oil production. In particular, waters with a very high salt load, containing large amounts of calcium compounds and magnesium compounds, which are initially still dissolved, are frequently observed in the amounts of water obtained with crude oil. However, this high content of calcium compounds eaily leads to obstruction or blockages in the conveyor pipelines.

The National Association of Corrosion Engineers (NACE) has standardized test methods which allow testing of compounds which are said to be capable of preventing deposition or precipitation of calcium carbonate or calcium sulfate from corresponding solutions or soles. The NACE standard TM 03-74 has been used as the test method in the examples which follow. In these tests, it was found that exceptionally small amounts of, for example, 0.5 to 1 ppm of an approximately 15% strength aqueous solution of a hydrolysis product of the polymers according to the invention are already sufficient completely to prevent deposition of calcium sulfate under the chosen conditions. It is more difficult to prevent deposition of calcium carbonate. According to the investigations carried out, about 5 ppm of the 15% strength hydrolysate solution are required to keep at least 60% of the calcium carbonate which otherwise precipitates in solution.

It is of course possible for the products according to the invention also to be subjected to acid hydrolysis. However, under these circumstances, a higher residual nitrogen content than in the case of alkali hydrolysis is usually observed, which is probably to be attributed to a higher stability of the acrylamide groups formed during hydrolysis. If copolymers of acrylonitrile and vinyl acetate, for example, are subjected to acid hydrolysis, lactones with five-membered rings may form or reactions which crosslink the chains via lactone bridge may occur.

The examples which follow serve to illustrate the invention further. Unless expressly indicated otherwise, the parts and percentages relate to units of weight. The following measurement and determination methods were used:

The K values of the above polymers were calculated, after determination of the $\eta_{rel}$ values on solutions of 0.5 g of polymer in 100 ml of dimethylformamide at 20° C. with the aid of Ubbelohde viscometers with a suspended ball level, from the formulae of Fikentscher, Cellulosechemie 13, (1932), 58 et seq. The molecular weights $M_v$ were determined by the formulae of Marzolph and Scholtan in "Makromolekulare Chemie 57, 52 et seq. (1962)". The intrinsic viscosity [η] was likewise determined with the aid of Ubbelohde viscometers on solutions of varying concentration in dimethylformamide at 20° C.

The total amount of strongly acid groups (sulfonate and sulfate groups) was determined with the aid of various ion exchanger columns. For this, for example, 5 g of the polymer to be investigated are dissolved in 500 ml of dimethylformamide and the solution is passed over a first ion exchanger column with 100 ml of a strongly acid exchanger resin (®Levatit S 100 from Bayer AG). The resulting eluate is then passed over a second ion exchanger with 100 ml of a mixed bed resin of strongly acid and strongly basic ion exchanger resins (Levatit S 100/®Duolite A 101D from Diamond Shamrock) and then again over 100 ml of a strongly acid ion exchanger. All the salts which are not bonded to the polymer are removed from the solution to be investigated by using the mixed bed exchanger.

The total content of strongly acid sulfonate and sulfate end groups is then obtained by potentiometric, non-aqueous titration of a given amount of eluate obtained after passage through the third ion exchanger column. Parallel to this, a dry content determination is carried out on about 20 g of eluate, for which the corresponding sample is dried in a vacuum drying cabinet at temperatures between 100° and 120° C.

To determine the sulfonate groups bonded directly to the polymer, the polymer to be investigated is first subjected to acid aqueous hydrolysis. For this, for example, 100 ml of a 0.2% strength aqueous oxalic acid solution are added to 15 g of the polymer powder and the mixture is boiled under reflux for 4 hours. The reaction solution is then filtered and the residue is washed carefully with hot distilled water until free from acid, after-treated with alcohol and dried at 60° C. An approximately 1% strength solution in dimethylformamide is prepared, as described above, from this hydrolyzed washed and dried sample, which now still contains only sulfonate groups, since the sulfate ester groups have been split off, and the content is analyzed, after passage through the ion exchanger column system and subsequent potentiometric titration and separate dry value determination.

The content of sulfate groups is obtained from the difference between the total content of sulfonate and sulfate groups and the separately determined content of sulfonate groups. Distilled or completely demineralized water was always used in the polymerizations carried out.

EXAMPLE 1

2,622 ml of distilled water, 264 mg of $(NH_4)_2Fe(SO_4)_2.6H_2O$, 8.2 ml of 10% strength $H_2SO_4$, 12.2 g of $K_2S_2O_8$, dissolved in 600 ml of distilled $H_2O$, and 146.4 g of $Na_2S_2O_5$, dissolved in 970 ml of distilled $H_2O$, were introduced, after displacement of the air by $CO_2$, into a 5 liter four-necked glass flask provided with a double-blade sstirrer and an outlet. The mixture was heated up to 55° C. and kept at this temperature with the aid of a thermostat. After the given temperature had been reached, continuous metering of the following four metering liquids was started. The following were metered per hour:

1. 611 ml of monomer mixture consisting of 585 ml of acrylonitrile and 26 ml of methyl acrylate
2. 1,166 ml of distilled $H_2O$ containing 93.4 mg of $(NH_4)_2Fe(SO_4)_2.6H_2O$ and 2.8 ml of 10% strength $H_2SO_4$, 3. 8.6 g of $K_2S_2O_8$, dissolved in 160 ml of distilled $H_2O$, and 4. 103.2 g of $Na_2S_2O_5$, dissolved in 160 ml of distilled $H_2O$.

2,100 ml of polymer suspension per hour were removed continuously from the reaction flask with the aid of a hosepump, the reaction volume and the average residence time of the reactants during the polymerization being kept constant.

The polymerization started after about 15 minutes, which was to be observed by clouding of the solution, and polymerization equilibrium was reached within 8 hours, after which the K value, the polymer yield, the particle shape and the polymer properties remains constant. The pH value of the reaction solution was measured as 2.87. The polymer suspension removed was neutralized in a second flask with the aid of 5% strength NaOH solution, and hence the polymerization was also stopped, and the polymer was isolated by filtration or centrifugation, washed with water and dried at 40° C. in a vacuum drying cabinet.

The K value of the resulting copolymer was 34 and the molecular weight $M_v$ was about 9,000. The polymer yield was 80% and the space/time yield was 95 g of polymer/liter.hour. The polymer contained 1.04% of sulfur and 260 mequiv/kg of strongly acid sulfonate and sulfate groups, of which 190 mequiv/kg were sulfonate groups.

It is of course also possible to stop the polymerization reaction by adding other known compounds, such as, for example, hydroquinone, especially if neutralization of the reaction solution is to be omitted.

EXAMPLE 2

The procedure followed was as under Example 1, but 292.8 g of $Na_2S_2O_5$, dissolved in 970 ml of distilled water, was used in the initial mixture. The other components remained unchanged. The amounts metered per hour were:

1. 611 ml of monomer mixture as in Example 1, 2. 1,006 ml of distilled $H_2O$, containing 93.4 mg of $(NH_4)_2Fe(SO_4)_2.6H_2O$ and 2.8 ml of 10% strength $H_2SO_4$ 3. 8.6 g of $K_2S_2O_8$, dissolved in 160 ml of distilled $H_2O$ 4. 206.4 g of $Na_2S_2O_5$, dissolved in 320 ml of distilled $H_2O$.

The pH value of the reaction mixture at equilibrium was 2.74.

A copolymer was obtained with a K value of 31 and a molecular weight $M_v$ of about 7,300 in a yield of 66% and a space/time yield of 78 g of polymer/liter.hour. The sulfur content was 1.42%, the content of sulfonate and sulfate end groups was 367 mequiv/kg and the content of sulfonate end groups alone was 265 mequiv/kg.

EXAMPLE 3

The procedure followed was as in Example 1, but with different initial amounts and metering liquids. The initial mixture consisted of 2,622 ml of distilled $H_2O$, 264 mg of $(NH_4)_2Fe(SO_4)_2.6H_2O$, 8.2 ml of 10% strength $H_2SO_4$, 15.2 g of $K_2S_2O_8$, dissolved in 600 ml of $H_2O$, and 364.8 g of $Na_2S_2O_5$, dissolved in 970 ml of $H_2O$. The following were metered per hour:

1. 611 ml of monomer mixture as in Example 1

2. 526 ml of $H_2O$ containing 93.4 mg of $(NH_4)_2Fe(SO_4)_2.6H_2O$ and 2.8 ml of 10% strength $H_2SO_4$ 3. 10.8 g of $K_2S_2O_8$, dissolved in 320 ml of $H_2O$ 4. 259.2 g of $Na_2S_2O_5$, dissolved in 640 ml of $H_2O$ In the stationary state, a pH value of the reaction solution of 2.73 was measured. The resulting copolymer had a K value of 28 and a molecular weight $M_v$ of about 6,300, the polymer yield was 54% and the space/time yield was 64 g of polymer/liter.hour. The polymer contained 1.64% of sulfur and had a total content of strongly acid groups of 424 mequiv/kg, of which 292 mequiv/kg were sulfonate groups.

EXAMPLE 4

Example 3 was repeated, but only acrylonitrile was used as the monomer. The initial mixture corresponded to that of Example 3, and the composition of the metering liquids and the amounts metered were changed only slightly:

1. 614.4 ml of acrylonitrile 2. 522.7 ml of $H_2O$ containing 93.2 mg of $(NH_4)_2Fe(SO_4)_2.H_2O$ and 2.9 ml of 10% strength $H_2SO_4$ 3. 10.8 g of $K_2S_2O_8$, dissolved in 320 ml of water 4. 259.2 g of $Na_2S_2O_5$, dissolved in 640 ml of water.

In the stationary state, a pH value of 2.78 was measured in the reaction mixture. The resulting homopolymer had a K value of 23 and its molecular weight $M_v$ was about 5,000. A polymer yield of 58% and a space/time yield of 68 g/liter.hour were found. The sulfur content in the polyacrylonitrile was 2.19% and the total content of sulfonate and sulfate groups was 563 mequiv/kg, of which 451 mequiv/kg were sulfonate groups.

EXAMPLE 5

The initial mixture used was as described under Example 3, and the following amounts of liquid were metered:

1. 520.8 ml of acrylonitrile 2. 619.2 ml of water containing 99.0 ml of $(NH_4)_2Fe(SO_4)_2.H_2O$ and 3.1 ml of 10% strength $H_2SO_4$ 3. 10.8 g of $K_2S_2O_8$, dissolved in 320 ml of water.

4. 259.2 g of $Na_2S_2O_5$, dissolved in 640 ml of water.

The pH value of the reaction solution in the stationary state was 2.75. A homopolymer was obtained with a K value of 19.5 and a molecular weight $M_v$ of about 4,000. The polymer yield was 50% and the space/time yield was 50 g of polymer/liter.hour. The sulfur content of the polymer was determined as 2.61%.

EXAMPLE 6

Example 5 was repeated with a reduced amount of monomer. The initial mixture remained unchanged, and the following were metered per hour:

1. 449.5 ml of acrylonitrile 2. 687.4 ml of water containing 103.5 mg of $(NH_4)_2Fe(SO_4)_2.6H_2O$ and 3.1 ml of 10% strength $H_2SO_4$ 3. 10.8 g of $K_2S_2O_8$, dissolved in 320 ml of water 4. 259.2 g of $Na_2S_2O_5$, dissolved in 640 ml of water.

The pH value of the reaction mixture was 2.75 in the stationary state. The resulting homopolymer had a K value of 18 and a molecular weight $M_v$ of about 3,500. The polymer yield was about 56%, the space/time yield was 48 g/liter.hour and the sulfur content was 2.90%.

EXAMPLE 7

The initial mixture chosen corresponding to that of Example 3, and the following were metered:
1. 303.9 ml of acrylonitrile
2. 832.6 ml of water containing 112.6 mg of $(NH_4)_2Fe(SO_4)_2.6H_2O$ and 3.5 ml of 10% strength $H_2SO_4$
3. 10.8 g of $K_2S_2O_8$, dissolved in 320 ml of water
4. 259.2 g of $Na_2S_2O_5$, dissolved in 640 ml of water.

The pH value in the stationary state was 2.63. The resulting homopolymer had a K value of 15.5 and a molecular weight $M_v$ of about 2,700. The sulfur content was 4.56% and the total amount of strongly acid groups was 986 mequiv/kg, of which 871 mequiv/kg were sulfonate groups. The polymer yield was about 42% and the space/time yield was 24.5 g/liter.hour.

EXAMPLE 8

The procedure followed was as in the preceding examples, using the device according to Example 1. the initial mixture used was 2,022 ml of water containing 2,640 mg of $(NH_4)_2Fe(SO_4)_2.6H_2O$, 8.2 ml of 10% strength $H_2SO_4$, 18.3 g of $K_2S_2O_8$, dissolved in 600 ml of water, and 549.0 g of $Na_2S_2O_5$, dissolved in 1,570 ml of water. The following amounts were metered in per hour:
1. 303.9 ml of acrylonitrile
2. 672.6 ml of water containing 1,126 mg of $(NH_4)_2Fe(SO_4)_2.6H_2O$ and 3.5 ml of 10% strength $H_2SO_4$
3. 12.9 g of $K_2S_2O_8$, dissolved in 320 ml of water
4. 387.0 g of $Na_2S_2O_5$, dissolved in 800 ml of water.

The pH value of the reaction solution in the stationary state was 2.72 and the resulting homopolymer has a K value of 16, a molecular weight of about 3,000 and a sulfur content of 5.8%.

EXAMPLE 9

The device according to Example 1 was again used. The initial mixture used was 2,022 ml of water containing 2,640 mg of $(NH_4)_2Fe(SO_4)_2.6H_2O$, 8.2 ml of 10% strength $H_2SO_4$, 45.8 g of $K_2S_2O_8$, dissolved in 1,200 ml of water, and 126 g of $Na_2S_2O_5$, dissolved in 970 ml of water. The following amounts were metered per hour:
1. 303.9 ml of acrylonitrile
2. 472.4 ml of distilled water containing 1,126 mg of $(NH_4)_2Fe(SO_4)_2.6H_2O$ and 3.5 ml of 10% strength $H_2SO_4$
3. 39.2 g of $K_2S_2O_8$, dissolved in 1,000 ml of water
4. 107.8 g of $Na_2S_2O_5$, dissolved in 320 ml of water.

The reaction mixture exhibited a pH value of 1.75 in the stationary state and the resulting polymer had a K value of 19, a molecular weight $M_v$ of about 3,700 and a sulfur content of 2.86%.

The following Examples 10 to 13 illustrate the influence of changes in the individual parameters.

EXAMPLE 10

Example 1 was repeated, but only an amount of 34.4 g of $Na_2S_2O_5$ per hour was metered in. As a result of this change, the weight ratio of catalyst to activator was reduced from 1:12 to 1:4. In addition, only one third of the amount of $Na_2S_2O_5$ (48.7 g) was used in the initial mixture. Under these conditions, a stationary state was established at which the reaction mixture had a pH value of 2.53. However, the resulting polymer no longer had a K value of 34, but a K value of 44.

EXAMPLE 11

The batch of Example 3 was repeated, but the residence time of Example 3 of 2 hours was reduced in this Example 11 to 1 hour by doubling the amount of reaction mixture removed per hour from 2,100 ml to 4,200 ml and correspondingly increasing the amounts metered in by a factor of 2. In detail, the following amounts were metered per hour:
1. 1,222 ml of monomer mixture
2. 1,052 ml of water containing 186.8 mg of $(NH_4)_2Fe(SO_4)_2.6H_2O$ and 5.6 ml of 10% strength $H_2SO_4$
3. 21.6 g of $K_2S_2O_8$, dissolved in 640 ml of water
4. 518.4 g of $Na_2S_2O_5$, dissolved in 1,280 ml of water.

In the stationary state, the reaction mixture exhibited a pH value of 2.75. Under these circumstances, a copolymer was produced which no longer had a K value of 28 but a K value of 31.

EXAMPLE 12

Example 11 was repeated, but the amount of Mohr's salt metered in was reduced from 186.8 mg to 18.7 mg per hour. The amount of this substance in the initial mixture was correspondingly reduced to 26.4 mg. Under these conditions, a copolymer was obtained which had a K value of 45, i.e. outside the range claimed.

EXAMPLE 13

Example 4 was repeated, but the amount of catalyst and activator was reduced, although the ratio of catalyst to activator remained unchanged at 1:24. In Example 13, only 8.6 g of $K_2S_2O_8$ and 206.4 g of $Na_2S_2O_5$ were added per hour. The content of catalyst and activator in the initial mixture was also correspondingly reduced to 12.2 g of $K_2S_2O_8$ and 292.3 g of $Na_2S_2O_5$. The pH value of the solution in the stationary state was measured as 2.86. However, the resulting polymer had a K value of 27, and no longer 23 as in Example 4.

EXAMPLE 14

192 g of NaOH lozenges were dissolved in 2,490 ml of water in a 4 liter three-necked flask with a stirrer and reflux condenser. The 7.16% strength sodium hydroxide solution was heated to the boiling point and three portions of in total 318 g of the copolymer of acrylonitrile and methyl acrylate with a K value of 34 which was obtained according to Example 1 were then added in the course of 15 minutes. At the start of the vigorous reaction, which proceeds with evolution of ammonia, the suspension becomes deep red-coloured. On further heating, a homogeneous yellow solution is then formed. The hydrolysis had ended after 6 hours. The hydrolysate solution had the following properties:
solids content; 19.2%,
residual nitrogen; 0.9%,
carboxyl groups which can be determined acidimetrically; 5.5%.

The hydrolysis was repeated, except that the molar ratio of nitrile groups to NaOH was increased from 1:0.8 to 1:1.2. The higher content of alkali led to a more vigorous reaction. The resulting hydrolysis solution had the following values:
solids content; 22.9%, content of residual nitrogen; 0.5%,
content of COOH groups; 6.9%.

EXAMPLE 15

30.2 g of NaOH were dissolved in 392 ml of water in a 1 liter three-necked flask, the solution was heated to the boiling point and 157.6 g of a moist acrylonitrile homopolymer from Example 7 were added in portions. The moist polymer was obtained as a centrifuge residue with a solids content of 32% and had a K value of 15. The mixture was again hydrolyzed under reflux at the boil for 6 hours, and the nitrile group:NaOH molar ratio was 1:0.8.

EXAMPLE 16

The hydrolysis product according to Example 14 was tested for use as a scale inhibitor in accordance with the laboratory test method NACE standard TM/03/74. In this test, the amount of $CaSO_4$ or $CaCO_3$ present in the solution on addition of inhibitors is determined in comparison with a blank sample.

$CaSO_4$ test: Two solutions are required: solution (A) containing 7.5 g/liter of NaCl and 11.1 g/liter of $CaCl_2.2H_2O$, and a solution (B) containing 7.5 g/liter of NaCl and 10.66 g/liter of $Na_2SO_4$. In each case, 50 ml of solution (A) and (B) are mixed in a bottle and, after addition of a given amount of hydrolysis product, the bottle is tightly closed, shaken thoroughly and heated at 71° C. for 72 hours. 1 ml of the clear, crystal-free solution above the $CaSO_4$ precipitate is then removed very carefully and diluted in a flask and the content of calcium ions present in the sample removed is determined complexometrically.

$CaCO_3$ test: In this case also, two solutions are required. Solution (A) contains 12.15 g/liter of $CaCl_2.2H_2O$, 3.68 g/liter of $MgCl_2.6H_2O$ and 33 g/liter of NaCl, whilst solution (B) contains 7.36 g/liter of $NaHCO_3$, 0.0294 g/liter of $Na_2SO_4$ and 33 g/liter of NaCl. The two solutions are initially saturated with $CO_2$ and in each case 50 ml of the two solutions are then mixed with one another, measured amounts of hydrolysis product are added and the solutions are further treated as in the $CaSO_4$ test.

The results of the $CaSO_4$ test and of the $CaCO_3$ test on addition of hydrolysis solutions obtained according to Example 14, an even greater variation in the nitrile group/NaOH molar ratio having been made, are shown in Tables 1 and 2. The tables show, in addition to the given molar ratio, the content of calcium ions in mg/liter in the supernatant solution after addition of a corresponding amount of hydrolysate solution. The hydrolysate solutions can be regarded as being about 15% strength. The variations in the measurement values are in all probability to be attributed to extremely small crystals of calcium sulfate or calcium carbonate taken up with the sample.

EXAMPLE 17

Example 16 was repeated, but in this case with addition of a hydrolysis solution according to Example 15. In this case, also various runs which were obtained for different molar ratios of nitrile groups to NaOH during hydrolysis were investigated. The results have been recorded in Tables 3 and 4. As in the preceding example, an effectiveness in the $CaSO_4$ test to below 0.5 ppm of an approximately 15% strength hydrolysate solution was again found. The influence of the molar ratio of nitrile groups to NaOH in the hydrolysis does not appear to play a role in the $CaSO_4$ test. In contrast, it can be seen from Table 4, the $CaCO_3$ test, that a higher nitrile group/NaOH ratio leads to a more effective product.

TABLE 1

$CaSO_4$ test:

| Run | Molar ratio of nitrile groups/NaOH | 0 (blank sample) | Content of $Ca^{++}$ ions in mg/l after addition of an approximately 15% strength hydrolysate solution in ppm | | | | | | |
|---|---|---|---|---|---|---|---|---|---|
| | | | 20 | 10 | 5 | 3 | 1 | 0.5 | 0.1 |
| a | 1:0.8 | 3620 | 5400 | 5090 | 5360 | 5260 | 5770 | 5200 | 3590 |
| b | 1:1 | 3600 | 4980 | 5140 | 5390 | 5170 | 5270 | 5090 | 3940 |
| c | 1:1.2 | 3620 | 5100 | 5390 | 5280 | 5230 | 5200 | 4680 | 3540 |
| d | 1:1.5 | 3670 | 5100 | 5170 | 5050 | 5180 | 5250 | 5220 | 3580 |

The maximum possible content was 5,535 mg of $Ca^{++}$/l

TABLE 2

$CaCO_3$ test:

| Run | Molar ratio of nitrile groups/NaOH | 0 (blank sample) | Content of $Ca^{++}$ ions in mg/l after addition of an approximately 15% strength hydrolysate solution in ppm | | | | |
|---|---|---|---|---|---|---|---|
| | | | 20 | 10 | 5 | 3 | 1 |
| a | 1:0.8 | 3100 | 3730 | 3740 | 3690 | 3640 | 3450 |
| b | 1:1 | 3160 | 3900 | 4040 | 4100 | 4070 | 3500 |
| c | 1:1.2 | 3200 | 4100 | 4190 | 4230 | 4190 | 3750 |
| d | 1:1.5 | 3160 | 4340 | 4120 | 4300 | 3940 | 3360 |

The maximum possible content was 5,000 mg of $Ca^{++}$/l

TABLE 3

$CaSO_4$ test:

| Run | Molar ratio of nitrile groups/NaOH | 0 (blank sample) | Content of $Ca^{++}$ ions in mg/l after addition of an approximately 15% strength hydrolysate solution in ppm | | | | | | |
|---|---|---|---|---|---|---|---|---|---|
| | | | 20 | 10 | 5 | 3 | 1 | 0.5 | 0.1 |
| e | 1:0.8 | 3520 | 5100 | 5090 | 5100 | 5100 | 5030 | 5030 | 3630 |
| f | 1:1.5 | 3520 | 5170 | 5220 | 5360 | 5280 | 5150 | 5130 | 4980 |
| g | 1:2.0 | 3590 | 5100 | 4980 | 5250 | 5080 | 5110 | 5060 | 3760 |

The maximum possible content was 5,140 mg of $Ca^{++}$/l

TABLE 4

CaCO₃ test:
Content of $Ca^{++}$ ions in mg/l after addition of an approximately 15% strength hydrolysate solution in ppm

| Run | Molar ratio of nitrile groups/NaOH | 0 (blank sample) | 20 | 10 | 5 | 3 | 1 |
|---|---|---|---|---|---|---|---|
| e | 1:0.8 | 3080 | 3340 | 3560 | 3290 | 3320 | 3200 |
| f | 1:1.5 | 3080 | 3950 | 4230 | 4020 | 3640 | 3480 |
| g | 1:2.0 | 3200 | 4100 | 4230 | 3900 | 4040 | 3720 |

The maximum possible content was 5,000 mg of $Ca^{++}/l$

We claim:
1. A homopolymer or copolymer of acrylonitrile which contains at least 60% by weight of acrylonitrile units and up to 40% by weight of units which can be copolymerized with acrylonitrile, in which said polymer is characterized by a Fikentscher K value in the range of 34 to 15 and a total content of sulfonate and sulfate end groups, which do not originate from comonomers containing sulfonate or sulfate groups, of 250 to 1,000 milliequivalents per kg of polymer, with a content of sulfonate end groups of 180 to 900 milliequivalents per kg of polymer.

* * * * *